Sept. 27, 1966 E. E. BIRR 3,275,950
DOUBLE SIDEBAND SUPPRESSED CARRIER BALANCED MODULATOR CIRCUIT
Filed April 29, 1963
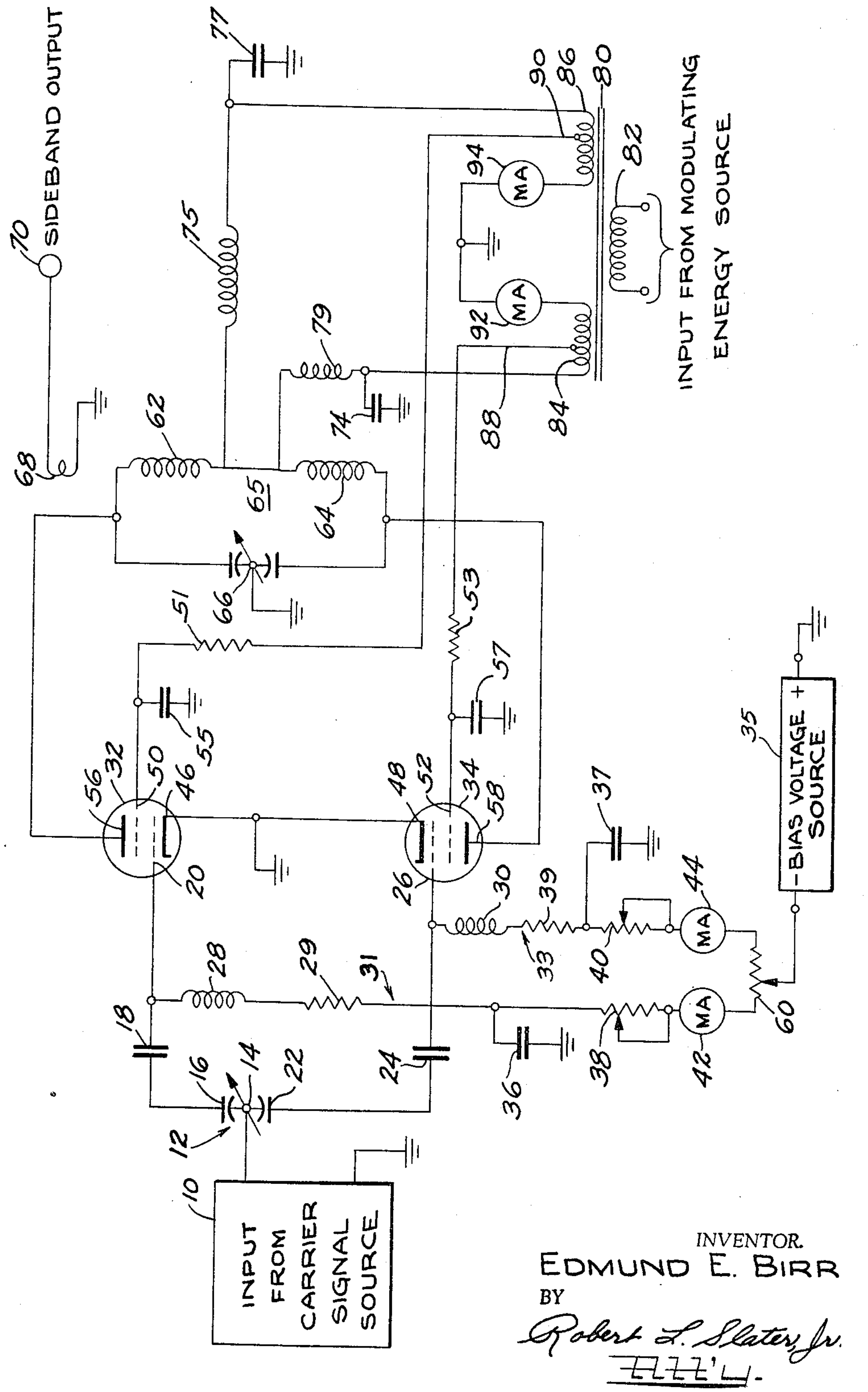
INVENTOR.
EDMUND E. BIRR
BY
Robert L. Slater, Jr.
ATTY.

United States Patent Office 3,275,950

Patented Sept. 27, 1966

3,275,950

DOUBLE SIDEBAND SUPPRESSED CARRIER BALANCED MODULATOR CIRCUIT

Edmund E. Birr, Lombard, Ill., assignor to Televiso Electronics, Division of Doughboy Industries, Inc., Wheeling, Ill., a corporation of Wisconsin Filed Apr. 29, 1963, Ser. No. 276,289

5 Claims. (Cl. 332—43)

The invention relates generally to electronic devices and more particularly to a signal translating device comprising an improved double sideband suppressed carrier balance modulator circuit.

In many applications it is desirable to generate a double sideband suppressed carrier signal. Since, in accordance with the principles of carrier modulation, the intelligence to be transmitted by means of a modulated radio frequency carrier signal appears entirely in the sidebands which result from the modulation process, the elimination of the carrier signal altogether offers many advantages. Among these are the more efficient deployment of the available radio frequency spectrum the multiplexing of a plurality of signals on a single electrical line, the further elimination of one set of the sidebands to produce a single sideband suppressed carrier signal for additional conservation of spectrum utilization, and various special cases which require properly phased double sideband signals for such applications as radio direction finding. As an illustration of an application of the latter, the instrument landing system localizer beam for aircraft guidance guidance utilizes in part a method of double sideband modulation which enables the aircraft to receive highly accurate position information as a result of the relationship between the reception of a modulated carrier frequency and the reception of a set of double sideband modulated frequencies, both of which are transmitted and suitably phased with respect to the desired flight path of the aircraft by means of directive antenna arrays.

There are a considerable number of ways in which a double sideband suppressed carrier signal can be generated, but generally all of the methods require some form of balanced modulator. A typical balanced modulator comprises two amplifiers, each having an input circuit which introduces the carrier signal in the same phase to each amplifier, and an output circuit to which is applied the desired modulating signal or signals and which is connected together in such a way that the carrier signal is cancelled in the output circuit leaving only the sideband modulation components. Since any non-linear element will effect modulation of two or more separate input signals, it is possible to design balanced modulators by utilizing the non-linear characteristics of either vacuum tubes, such as amplifiers for use as active modulator elements, or by utilizing the non-linear characteristics of solid state devices including crystal diodes, such as diode ring modulators for use as passive modulator elements.

One of the disadvantages of utilizing diodes or other passive type circuit elements in balanced modulators is primarily one of obtaining sideband output at relatively high power levels. Typically. the operating level of passive diode balanced modulators is restricted to levels of under one watt and, in addition, most passive type balanced modulators introduce a net insertion loss of overall gain in the circuits where they are employed. On the other hand, one advantage of vacuum tube balanced modulators is that they can produce outputs on the order of several hundred watts with relative ease. Subsequent amplification of double sideband suppressed carrier signals requires the use of highly linear amplifiers which are often expensive to produce and difficult to adjust. It is, therefore, highly desirable to generate the double sideband suppressed carrier signal at as high a level as is practical. Furthermore, vacuum tube balanced modulators have other desirable circuit features. Balanced modulators using vacuum tubes can be designed with relatively high impedance input circuits and with output circuits that are readily adaptable to match a wide range of output impedances, thus offering a flexibility not found in other types of balanced modulators. The foregoing characteristics simplify problems of input and output circuit loading, isolation, and impedance matching, resulting in increased efficiency and linearity.

There are, however, several important difficulties encountered with earlier vacuum tube balanced modulators as described in the previous state of the art. Among these is the problem of obtaining balance between pairs of vacuum tubes, the operating parameters of which may change or drift as a function of aging or as a function of changes in ambient and operating temperatures. A further problem is one of obtaining balance between the tubes as the input signals vary or as the potentials applied to the plate or screen circuits of the tubes vary either as a result of fluctuations in power supply voltages or as a resultant of transient changes in the plate or screen potentials during the tube operating cycle. In addition, vacuum tube balanced modulators frequently have a limited dynamic range over which the output is linear and may require critical adjustments of input signal levels to compensate for the aforementioned problems of circuit balance.

Another problem often encountered in previous vacuum tube balanced modulators results from the fact that at least two or more tubes are employed in the circuit and the effects of interaction that exit between the tubes during the operating cycles of each tube may adversely affect the operating cycle of the other tube. Such interaction may seriously reduce the overall efficiency of the circuit.

Heretofore, one of the more troublesome problems in the design of vacuum tube balanced modulators has been the effect of changes in grid bias affecting the performance of the circuit. Changes in the D.C. grid bias of one of the modulator tubes can affect the bias condition of the other tube, resulting in an overall loss of efficiency in the circuit. There is also the problem of unbalance introduced by the improper phasing of carrier input signals to the grids of each of the input tubes.

It is therefore an object of my invention to provide an improved electronic device of the signal translating type.

It is another object of my invention to provide an improved electronic circuit which is capable of generating a double sideband suppressed carrier output signal at relatively high power levels.

It is another object of my invention to provide an improved double sideband suppressed carrier balanced modulator.

It is another object of my invention to provide an improved balanced modulator utilizing vacuum tubes.

It is still another object of my invention to provide an improved balanced modulator having increased efficiency and in which significantly less plate circuit input power is required to generate the same output power as compared with previous devices of the earlier art.

It is yet another object of my invention to provide a balanced modulator circuit which permits independent and separate control of the D.C. grid bias to each of the vacuum tubes and in which independent metering of the grid currents of each of the vacuum tubes is available.

It is a further object of my invention to provide a balanced modulator circuit in which independent and separate control of the phase of grid driving voltage and current to each of the vacuum tube grid circuits is available.

Further objects, features, and novelties of my invention will become apparent when considered in connection with the accompanying drawing, and the specification and claims as set forth below.

The figure illustrates a schematic diagram of a preferred embodiment of my invention.

Stated broadly, my invention is an improved balanced modulator sideband generator comprised of two vacuum tube amplifier stages operated in the class C mode. The amplifiers are combined in a circuit configuration which is commonly referred to as a carrier balanced amplifier; that is to say, the control grids of both tubes are connected in parallel and driven in phase from a common source of carrier signal energy, while the plate of each tube is connected in a "push-pull" configuration to a resonant tank circuit so that the plate signal in the respective tubes is operated 180 degrees out of phase. The modulating signal is introduced into the amplifier tubes through the plate circuit by means of a modulation transformer. The control grid of each tube is biased independently of the other, and each grid is separately returned to an adjustable low impedance source of D.C. grid bias voltage.

Referring now to FIGURE 1, a source of R.F. carrier signal energy 10 is coupled to an input circuit comprising in part the rotor plates 14 of the variable input phasing capacitor 12. The input circuit may be either resonant or nonresonant at the R.F. carrier signal frequency. In the embodiment shown in FIGURE 1 a resonant input circuit tuneable to a carrier frequency in the approximate range of 108 to 112 megacycles is illustrated. The source of carrier signal energy commonly comprises an oscillator or buffer amplifier which supplies a sine wave signal at the desired carrier frequency to the input of the balanced modulator. Stator plates 16 and 22 of the variable input phasing and tuning capacitor 12 are connected respectively to D.C. blocking capacitors 18 and 24. Blocking capacitor 18 is coupled to the control grid 20 of a multi-element vacuum tube 32. Similarly, blocking capacitor 24 is connected to the control grid 26 of a second multi-element vacuum tube 34.

A low impedance D.C. bias source 35, which may conveniently be obtained with a zener diode regulated power supply, is connected through separate grid return circuits 31 and 33 to the control grids 20 and 26, respectively, Grid return circuit 31 is comprised of a choke 28, a resistor 29, variable resistor 38 and a milliammeter 42 all connected in series. An R.F. bypass to ground comprised of capacitor 36 completes the first grid return circuit 31. The second grid return circuit 33 connecting control grid 26 to the bias voltage source 35 comprises a choke 30; resistor 39, variable resistor 40, and milliammeter 44 all in series, and an R.F. bypass to ground through capacitor 37.

The value of the R.F. choke coils is selected to have a relatively high impedance over the range of frequencies normally encountered in the operation of the grid return circuits. It is desirable that the resonant frequency of the choke coils 28 and 30, in combination with the bypass capacitors 36 and 37 respectively, lies substantially outside of the range of frequencies normally encountered in the operation of the circuit. A potentiometer 60 is inserted between the two grid return circuits in series with the bias voltage source 35 in order to permit balancing of the grid bias current and voltage between the two tubes.

Cathodes 46 and 48 in tubes 32 and 34 respectively, are directly connected and grounded as shown in the drawing.

A resonant tank circuit 65 which can be tuned to the fundamental of the carrier frequency is comprised of a split stator variable capacitor 66 and an inductor having two sections respectively 62 and 64. The rotor plates of the variable capacitor 66 are returned by a common lead to ground. A first set of stator plates of the capacitor 66 is connected to both the upper end of inductor 62 and to the plate 56 of tube 32. The second set of stator plates of capacitor 66 is connected to the lower end of inductor 64 and to the plate 58 of tube 34. The vacuum tube plates 56 and 58 are thus connected each to one-half of the parallel resonant tank circuit 65. The lower or R.F. "cold" end of inductor 62 is bypassed to ground for R.F. frequencies by means of bypass capacitor 77. Similarly, the upper or R.F. "cold" end of inductor 64 is bypassed to ground for R.F. frequencies by means of bypass capacitor 74. The "cold" end connections of the inductors 62, 64 are the electrical midpoint of the sum of the inductances 62 and 64. The tank circuit 65 is by reasons of the "cold" end connections and the split stator variable capacitor 66, balanced each side of ground. Sideband energy is drawn from the tank circuit through an output circuit comprising an output coupling coil 68 which may be juxtaposed to inductor 62 and other portions of tank circuit 65. The sideband output terminal 70 connects to ground through the coupling coil 68.

The modulating signal energy is coupled to the plate tank circuit 65 by means of modulation transformer 80 which has primary winding 82 and secondary windings 84 and 86. The primary winding 82 of the modulation transformer 80 is connected to the source of modulation energy, typically in the audio frequency range. A first end of each secondary winding is connected in series with a suitable current metering device, shown in the drawings as milliammeters 92 and 94. The meters 92 and 94 are grounded as shown in the drawing.

The respective second end leads of secondary windings 84 and 86 are connected to the R.F. "cold" ends at inductors 62 and 64 of tank circuit 65 through choke coils 79 and 75. The foregoing circuit is more readily understood by reference to the illustration. The secondary windings 84 and 86 each have an intermediate tap corresponding to 50% of the total number of winding turns. The secondary winding taps are shown as 88 and 90. The secondary taps 88 and 90 are connected to the screen grids 50 and 52 of the tubes 32 and 34 respectively. A series resistor 51 and an R.F. bypass capacitor 55 are inserted in the screen grid lead of tube 32. Likewise, a series resistor 53 and an R.F. bypass capacitor 57 are inserted in the screen grid lead of tube 34. The screen grid taps 88 and 90 of the modulation transformer 80 may be taken at other values than 50% as shown in the preferred embodiment of my invention, in order to accommodate tube types having somewhat different dynamic characteristics than those shown.

It is also possible to utilize triode vacuum tubes in the application of my invention. If triode vacuum tubes are utilized, the overall efficiency of the circuit will be reduced, but the operation of the circuit will be essentially unchanged. Screen grid taps 88 and 90, and screen circuit components 51, 53, 55 and 57 would not be used with triode vacuum tubes.

The values I have shown for the various circuit components and the voltages I have chosen for the various energizing sources are those for a preferred embodiment of my invention which I have constructed and which has been found to operate in a satisfactory manner. The values of the circuit components, the operating frequencies, and the voltages may be varied within reasonable limits and the resulting device remain within the scope of my invention.

The operation of my balanced modulator may be described as follows. Consider that the R.F. carrier signal energy source 10 is an oscillator providing a sine wave signal of the desired frequency. The input signal is coupled through the capacitor 12 and through capacitors 18 and 24 to the grids 20 and 26, respectively, of vacuum tubes 32 and 34. The input signal is fed simultaneously in phase to the grids of each tube, and the input circuit may be tuned to the fundamental frequency of the R.F. carrier signal source by adjustment of the variable capacitor 12. The inductive reactance of the R.F. choke coils 28 and 30 in series with the D.C. grid lead returns prevents the R.F. signal from appearing on the D.C. bias leads. The bypass capacitors 36 and 37 effectively shunt to ground any leakage R.F. energy which may feed through the choke coils. The grid bias potential for tube 32 is determined by the resistance setting of variable resistor 38. Normally, the grid bias potential is adjusted by providing grid drive to the tubes from the R.F. carrier signal energy source, thereby causing grid current to flow. The value of variable resistor 38 is adjusted until the grid bias potential at 20 is suitable for proper class C operation of the amplifier stage. In a like manner, the grid bias potential for tube 34 is adjusted by means of variable resistor 40. It can be seen that separate and independent adjustment of the D.C. grid bias on each tube is possible, thus permitting a range of bias values from which the proper selection may be made. Grid current meters 42 and 44 indicate the respective grid currents of tubes 32 and 34. The potentiometric device 60 across the meter lead returns and in series with the D.C. bias potential energy source permits fine balance adjustment between the two tubes under quiescent and operating conditions. The potentiometer 60 may be regarded as a three terminal voltage divider, the first two fixed end terminals of which are connected to the grid returns 31 and 33 respectively, and the third variable terminal which is connected to the D.C. bias energy source 35.

For purposes of illustration only, it is convenient to assume for the moment that the plate tank circuit is connected to a suitable source of D.C. energy. In this case the R.F. carrier signal applied to the grids of both tubes in phase will cause the plate currents of both tubes to also follow the grid signal in phase. Hence, the plate currents of tubes 32 and 34 will begin to rise when the input signal exceeds the negative bias applied to the grid. In typical class C operation, plate current will flow for a period equal to less than one-half of the sine wave period of the driving signal. Put in another way, the plate current will flow through an operating angle less than 180 degrees. The resonant frequency of the balanced plate tank circuit comprising capacitor 66 and inductors 62 and 64 is tuned to the fundamental frequency of the grid R.F. carrier signal energy source 10. As the plate current of both tubes will rise and fall in phase, current will flow through each half of the tank circuit in phase. The tank circuit being connected in balanced push-pull configuration to the plates of both tubes, the R.F. energy field created by each half of the tank circuit during the conduction period of both tubes will effectively cancel in the tank circuit and no signal will appear at the output coupling coil of the tank circuit if the circuit is in balance. The second harmonic frequency as well as all higher order harmonic frequencies will also be substantially suppressed as a result of the tank circuit resonance at the fundamental frequency of the carrier signal. It can be seen then that when the grids are driven in parallel and with the plates connected to a push-pull resonant tank circuit tuned to the fundamental of the grid drive frequency, the output of the balanced modulator substantially cancels the carrier signal in the absence of any modulating signal. However, in the embodiment of my invention shown in FIGURE 1, I have found that there is no need for a separate source of D.C. plate circuit energy. It is desirable in the case of a class C generator of the type shown to utilize the modulating signal for supplying energy to the plate tank circuit.

Consider now the case when a modulating signal is applied across the modulation transformer 80. Assume that the grids of both tubes are momentarily driven sufficiently positive by the carrier input signal such that both tubes are thus able to draw plate current in the presence of plate voltage. For purposes of illustration, it is convenient to assume that a sine wave modulating signal of a single frequency appears across the secondary of the modulation transformer. Thus, one side of the secondary winding 86 will be driven to the positive peak of the modulating signal while the other side of the secondary winding 84 will be driven to the negative peak of the modulating signal. Hence, tube 32 will be conducting as a result of the introduction of the modulating energy to the plate circuit which provides adequate positive plate voltage to insure that plate current will flow. However, tube 34 will be in a nonconducting state since the negative swing of the modulating signal momentarily removes positive plate voltage from tube 34 and, thus, no plate current will flow. Current will now flow through the upper half of the tank circuit comprising inductance 62 and capacitor 68 and no current will flow through the lower half of the tank circuit comprising inductance 64 and capacitor 66. Thus, the fields in the tank circuit are momentarily unbalanced and sideband modulation signal energy appears in the tank circuit field and in the output coupling coil 68. The tank circuit is still in balance for the carrier signal however and, although the sideband energy appears in the tank circuit field, the carrier signal energy is still substantially suppressed. When the modulating signal swings 180 degrees, the aforesaid balanced condition is reversed; that is to say, winding 86 swings negative, winding 84 swings positive, and current will flow through tube 34 and through the lower half of the tank circuit comprising inductance 64 and capacitor 66, while no current will flow through the upper half of the tank circuit comprising inductance 62 and capacitor 66. It can be seen that one tube operates on the positive half cycle of the modulating signal voltage swing while the other tube remains cut off on the negative portion of the same half cycle of the modulating voltage swing and vice versa.

The screen grids of both tubes are also driven by the modulating signal voltage to increase the efficiency of the circuit. The screen grids 50 and 52 are connected respectively to taps 88 and 90 on the modulating transformer 80 so that the screen voltage excursion of each tube on the modulating swing is less than that applied to the plate of the same tube.

It may be observed from consideration of the aforedescribed mode of operation of the circuit that at any instant while one tube of the pair has positive plate and screen voltage and is, therefore, drawing plate current, screen current and grid current, the other tube of the pair is drawing grid current only, since the screen and plate voltages of the non-conducting tube will be negative during that portion of the operating cycle. Stated differently, in the presence of a modulating signal each tube will conduct over one-half of the operating angle of the modulating signal. The grid characteristic curves of a vacuum tube are functionally related to the screen and plate potentials.

Stated generally, if the plate and screen potentials of a tube are relatively low or even negative, more space current will flow through the grid circuit for a given applied positive voltage on the grid. The latter effect results in a greater slope of the $e_g$, $i_g$ characteristics of the tube associated with relatively low or negative plate and screen potentials. It can be seen from the foregoing that in the case of a tube momentarily inactive or nonconducting as a result of negative plate and screen voltages on the modulation half swing, the increase in grid current momentarily raises the effective grid bias.

Consider now the case when the D.C. grid returns of two tubes operating in the aforedescribed mode are connected together and returned in common to the bias voltage source. The grid of the non-conducting tube can effectively clip the grid drive signal that is being applied to the grids of both tubes simultaneously and in so doing limit the grid drive voltage to the conducting tube such that it cannot be driven into the positive bias region. In such a case, the efficiency of the amplifier is limited, and normal, high efficiency class C operation cannot be obtained. Accordingly, by returning the D.C. grid bias leads of each tube through separate circuits, the foregoing undesirable effect is largely eliminated. The grid current of the non-conducting tube cannot affect the grid current, and therefore the grid bias, of the conducting tube, and normal class C operation of each tube is obtained. Preferably, the time constants of the grid circuits are chosen such that the momentary or transient increase in the grid bias of the non-conducting tube is dissipated before the tube enters into the conducting portion of the cycle. In the preferred embodiment of my invention as illustrated, I have observed an increase of efficiency of between 15% to 20% over circuits in which the control grid bias is determined by means of a D.C. return common to both grids.

The foregoing specification and drawings are merely illustrative of preferred embodiments of my invention, the scope of which is described in the following claims.

I claim:

1. An improved balanced modulator circuit comprising in combination two vacuum tubes each having an anode, a cathode and a control grid, a resonant circuit tuned to R.F. signal energy, a modulating signal energy source, the anodes being connected in push-pull configuration to the resonant circuit, the anodes being biased from the modulating energy source through the resonant circuit, the cathodes being connected to ground potential, an R.F. signal energy input terminal for applying R.F. signal energy, the control grids being connected in parallel to the R.F. signal energy input terminal; D.C. bias voltage means, and parallel separate connection means between the control grids and the D.C. bias voltage means, whereby the voltage excursions of the control grids of the individual tubes induced by the anode voltage excursions of the respective tubes are limited only by the impedance of the grid circuit associated with the individual tube.

2. An improved balanced modulator as described in claim 1 wherein the separate grid control connection means comprise a three terminal voltage divider, an inductance, and a current meter in series connection with one terminal of the voltage divider, this terminal being fixed, one terminal of the voltage divider being variable, which variable terminal is connected to the D.C. bias voltage means.

3. A signal translating device comprising in combination a first vacuum tube having a cathode, a control grid, and an anode; an input source of R.F. energy; means for capacitively coupling the R.F. energy to the control grid of the first tube; a terminal for input of D.C. bias energy; a first variable resistance element, said element being connected from the control grid of the first tube to the D.C. bias terminal; a tank circuit comprising an inductive element and a capacitive element, said elements being arranged in parallel wired configuration having a first end with a first terminal connection attached thereto and a second end with a second terminal connection attached thereto, said inductive element having in addition a center tap connection attached thereto, an amplitude modulating energy source and means for connecting said energy to the inductor center tap connection, the anode of the first tube being connected to the first terminal of the tank circuit and the cathode being grounded; a second vacuum tube having a cathode, a control grid, and an anode; means for capacitively coupling the R.F. energy to the grid of the second tube in identical phase relationship with the R.F. energy coupled to the grid of the first tube; a second variable resistance element, said element being connected from the control grid of the second tube to the D.C. bias energy terminal, the anode of the second tube being connected to the second terminal of the tank circuit and the cathode of the second tube being grounded; an output circuit; and means for coupling energy from the tank circuit to the output circuit.

4. An improved sideband generator comprising in combination a first vacuum tube having a cathode, a control grid, a screen grid, and an anode; a second vacuum tube having a cathode, a control grid, a screen grid, and an anode; an input source of R.F. carrier energy; means for capacitively coupling the R.F. carrier energy to the control grid of the first tube; D.C. bias energy means, a first variable resistance element, said element being connected from the control grid of the first tube to the D.C. bias energy means; means for capacitively coupling the R.F. carrier energy to the grid of the second tube in substantially identical phase relationship and with substantially identical amplitude as the R.F. carrier energy coupled to the grid of the first tube; a second variable resistance element, said second element being connected from the control grid of the second tube to the D.C. bias energy means; a resonant tank circuit comprising an inductive element and a capacitive element, said elements being arranged in parallel wired configuration, the tank circuit having a first end with a first terminal connection attached thereto and a second end with a second terminal connection attached thereto, the inductive element being interrupted in continuity at the electrical midpoint and having a first center end electrically continuous with the first terminal, a first center terminal attached thereto, and a second center end electrically continuous with the second terminal, a second center terminal attached thereto, and the anode of the first tube being connected to the first end terminal of the tank circuit and the anode of the second tube being connected to the second end terminal of the tank circuit; a source of A.C. modulating energy; a modulation transformer having a primary winding, a first secondary winding having a first end, a second end and an intermediate tap, and a second secondary winding having a first end, a second end and an intermediate tap, the primary winding of the transformer being connected to the source of A.C. modulating energy, the first end of the first secondary winding being connected to ground, the second end of the first secondary winding being connected to the first center terminal of the tank circuit inductance and the intermediate tap of the first secondary winding being connected to the screen grid of the first tube, the first end of the second secondary winding being connected to ground, the second end of the second secondary winding being connected to the second center terminal of the tank circuit inductance and the intermediate tap of the second secondary winding being connected to the screen grid of the second tube; an output circuit; and means for coupling energy from the tank circuit to the output circuit.

5. An improved balanced modulator circuit comprising in combination: two vacuum tubes each having an anode, a cathode and a control grid, a resonant circuit, the anodes being connected in push-pull configuration to the resonant circuit, the cathodes being connected to ground potential; an R.F. signal energy input terminal, the control grids being connected in parallel to this terminal; a three-terminal voltage divider for use with a D.C. bias energy source; and parallel separate connection means for applying D.C. bias voltage to the respective control grids, which means includes essentially adjustable resistive means connecting each control grid to one fixed end terminal of the voltage divider, the control grids thus being connected to the ends of the voltage divider, the third terminal of which voltage divider being connected to the D.C. bias energy source, which third terminal is adjustable to allow variable voltage division; whereby the voltage excursions of the control grids of the respective tubes induced by the anode voltage excursions of these respective tubes are limited only by the impedence of the grid circuit associated with each of the respective tubes.

References Cited by the Examiner

UNITED STATES PATENTS

| | | | |
|---|---|---|---|
| 2,130,893 | 9/1938 | Mouromtseff et al. | 332—60 X |
| 2,186,958 | 1/1940 | Collins | 332—43 X |
| 2,504,469 | 4/1950 | Tillman | 332—43 X |

HERMAN KARL SAALBACH, *Primary Examiner.*

ROY LAKE, *Examiner.*

P. L. GENSLER, *Assistant Examiner.*